(12) United States Patent
Kuwabara et al.

(10) Patent No.: US 8,369,643 B2
(45) Date of Patent: Feb. 5, 2013

(54) IMAGE PROCESSING METHOD, IMAGE PROCESSING APPARATUS, AND IMAGE PROCESSING PROGRAM

(75) Inventors: Takao Kuwabara, Kanagawa-ken (JP); Tomoko Taki, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 837 days.

(21) Appl. No.: 12/457,983

(22) Filed: Jun. 26, 2009

(65) Prior Publication Data

US 2009/0324123 A1 Dec. 31, 2009

(30) Foreign Application Priority Data

Jun. 27, 2008 (JP) .................................. 2008-168410

(51) Int. Cl.
*G06K 9/40* (2006.01)
*G06K 9/32* (2006.01)
(52) U.S. Cl. ........................ 382/260; 382/298
(58) Field of Classification Search .......... 382/128–134, 382/260–269, 274–275, 298–299, 305, 312; 358/1.2, 3.27, 463, 532; 348/278, 285, 683; 345/611, 660, 670, 671

See application file for complete search history.

(56) References Cited

U.S. PATENT DOCUMENTS

| | | | | |
|---|---|---|---|---|
| 5,485,371 A * | 1/1996 | Ito et al. | ........................ | 378/20 |
| 6,701,025 B1 * | 3/2004 | Avinash | ........................ | 382/261 |
| 7,091,512 B2 * | 8/2006 | Arakawa | ........................ | 250/586 |
| 7,657,112 B2 * | 2/2010 | Kuwabara | ........................ | 382/260 |
| 7,702,178 B2 * | 4/2010 | Bergen et al. | ................. | 382/275 |
| 8,160,381 B2 * | 4/2012 | Ovsiannikov | ................. | 382/261 |
| 2005/0053306 A1 | 3/2005 | Kuwabara | | |

* cited by examiner

*Primary Examiner* — Kanjibhai Patel
(74) *Attorney, Agent, or Firm* — Jean C. Edwards, Esq.; Edwards Neils PLLC

(57) ABSTRACT

The amount of time spent extracting linear noise components is reduced, when removing linear noise components from an image. A reduced image is generated, by reducing a radiation image in at least one of the vertical and horizontal directions. A linear noise image that represents linear noise components in the Y direction is generated, by extracting linear noise components from the reduced image. Thereafter, the generated linear noise image is enlarged to the image size of the original image; the linear noise components are removed from the radiation image, employing the enlarged linear noise image.

13 Claims, 12 Drawing Sheets

IMAGE PROCESSING METHOD, IMAGE PROCESSING APPARATUS, AND IMAGE PROCESSING PROGRAM

CROSS-REFERENCE TO RELATED APPLICATIONS

The present application claims priority from Japanese Patent Application No. 2008-168410, filed Jun. 27, 2008, the contents of which are herein incorporated by reference in their entirety.

BACKGROUND OF THE INVENTION

1. Field of the Invention

The present invention relates to an image processing method, an image processing apparatus, and an image processing program for removing linear noise components from within images.

2. Description of the Related Art

Conventionally, radiation images are obtained by irradiating subjects with radiation, and detecting the amounts of radiation which have passed through the subject. The obtained radiation images are employed to perform diagnosis of the subjects. Different apparatuses are used to obtain these radiation images for each body part of the subjects. For example, mammography apparatuses are employed to obtain radiation images of subjects' breasts, and general imaging apparatuses are employed to obtain two dimensional radiation images, such as chest X rays.

There are cases in which linear noise (striped blurs) are generated in radiation images obtained by the aforementioned apparatuses. For example, in the case that image information accumulated in a radiation detector is read out using a line sensor, linear noise may occur in a sub direction (the vertical direction in a radiation image) due to differences in properties of each of the light receiving portions that constitute the line sensor. Alternatively, there are cases in which linear noise appears in a main direction (the horizontal direction in a radiation image) due to shock which is imparted to a line sensor.

There is a known method for removing the aforementioned linear noise by administering a filtering process onto radiation images, as disclosed in U.S. Patent Application Publication No. 20050053306. In this method, linear noise components are extracted from radiation image data, then the extracted linear noise components are subtracted from a radiation image which is represented by the radiation image data. In addition, the linear noise components are extracted after a preliminary process for reducing drastic changes in pixel values is administered.

The amount of time necessary to extract the linear noise components by the filtering method disclosed in U.S. Patent Application Publication No. 20050053306 depends on the image size of the radiation image and the size of the filter. A great number of calculations are necessary to extract linear noise components, which takes time. Therefore, there is a desire to shorten the time necessary for the linear noise component extracting process.

SUMMARY OF THE INVENTION

It is an object of the present invention to provide an image processing apparatus, an image processing method, and an image processing program which are capable of shortening the time required to extract linear noise components, when removing the linear noise components.

An image processing apparatus of the present invention comprises:

image reducing means, for generating a reduced image by reducing an original image in at least one of a main direction and a sub direction;

noise image extracting means, for generating a linear noise image by extracting linear noise components from the reduced image generated by the image reducing means;

image enlarging means, for enlarging the linear noise image generated by the noise image extracting means to the image size of the original image; and image correcting means, for removing the linear noise components from the original image, employing the linear noise image which has been enlarged by the image enlarging means.

An image processing method of the present invention comprises the steps of:

generating a reduced image by reducing an original image in at least one of a main direction and a sub direction;

generating a linear noise image by extracting linear noise components from the generated reduced image;

enlarging the generated linear noise image generated to the image size of the original image; and image correcting means, for removing the linear noise components from the original image, employing the enlarged linear noise image.

An image processing program of the present invention causes a computer to execute the procedures of:

generating a reduced image by reducing an original image in at least one of a main direction and a sub direction;

generating a linear noise image by extracting linear noise components from the generated reduced image;

enlarging the generated linear noise image generated to the image size of the original image; and image correcting means, for removing the linear noise components from the original image, employing the enlarged linear noise image.

Here, the original image is not limited to any particular type of image, and may be a radiation image obtained by a mammography apparatus, or a radiation image obtained by chest imaging. In addition, the original image is not limited to those for medical use, and may be a radiation image for use in non destructive inspections. Further, the original image may be a radiation image which is used for offset correction, shading correction and the like.

The image reducing means needs only to reduce the original image in the main direction (the horizontal direction in the original image, for example) and/or the sub direction (the vertical direction in the original image, for example). The image reducing means may reduce the original image in the direction along which the linear noise extends, and in the case that the linear noise components include only low frequency components, the image reducing means may reduce the original image also in a direction perpendicular to the direction along which the linear noise extends.

The noise image extracting means may be of any configuration, as long as it extracts linear noise which is present within the original image. For example, the noise image extracting means may comprise: frequency processing means, for extracting high frequency components in a direction perpendicular to the direction of the linear noise components from the reduced image; and noise image generating means, for generating the linear noise image by extracting low frequency components that extend in the direction of the linear noise components from the high frequency components extracted by the frequency processing means.

Alternatively, the noise image extracting means may comprise: frequency processing means, for extracting high frequency components in a direction perpendicular to the direction of the linear noise components from the reduced image; line dividing means, for dividing pixel lines that extend along the linear noise components within the high frequency components extracted by the frequency processing means into a plurality of divided pixel line segments; median calculating means, for calculating median values of each of the divided pixel line segments; and noise image generating means, for generating a linear noise image that represents the linear noise components, employing the median values of each of the divided pixel line segments calculated by the median calculating means.

In this case, the number of pixels within each divided pixel line segment is not limited, as long as the line dividing means divides the pixel lines into a plurality of divided line pixels. However, it is preferable for the lengths of the divided pixel line segments to be twice or greater than the lengths of lines which may be present within anatomical structures. Note that the length which is twice or greater than the lengths of lines which may be present within anatomical structures is a length which is twice or greater than linear components which are included in anatomical structures. This length may be obtained empirically or statistically, and set in advance.

As a further alternative, the noise image extracting means may comprise: frequency processing means, for extracting high frequency components in a direction perpendicular to the direction of the linear noise components from the reduced image; first noise image generating means, for generating a first noise image by extracting low frequency components that extend in the direction of the linear noise components from the high frequency components extracted by the frequency processing means; line dividing means, for dividing pixel lines that extend along the linear noise components within the high frequency components extracted by the frequency processing means into a plurality of divided pixel line segments; median calculating means, for calculating median values of each of the divided pixel line segments; and second noise image generating means, for generating a second linear noise image that represents the linear noise components, employing the median values of each of the divided pixel line segments calculated by the median calculating means. In this case, the image correcting means may remove the linear noise components from the original image, employing the first noise image and the second noise image, which have been enlarged by the image enlarging means.

As a still further alternative, the noise image extracting means may comprise: frequency processing means, for extracting high frequency components and low frequency components in a direction perpendicular to the direction of the linear noise components from the reduced image; first noise image generating means, for generating a first noise image by extracting low frequency components that extend in the direction of the linear noise components from the high frequency components extracted by the frequency processing means; line dividing means, for dividing pixel lines that extend along the linear noise components within the low frequency components extracted by the frequency processing means into a plurality of divided pixel line segments; median calculating means, for calculating median values of each of the divided pixel line segments; and second noise image generating means, for generating a second linear noise image that represents the linear noise components, employing the median values of each of the divided pixel line segments calculated by the median calculating means.

In these cases, the noise image generating means may derive a function that represents the relationship between the positions of pixels in the pixel lines and the pixel values thereof, based on the plurality of median values calculated for each of the divided pixel line segments, and may generate the linear noise image employing the derived function to calculate the pixel value for each pixel in the linear noise image.

Also in these cases, the image correcting means is not limited to any specific configuration, as long as it employs the first linear noise image and the second linear noise image to correct the original image. An example of the image correcting means is that in which the absolute values of the pixel values of the first linear noise image and the second linear noise image are compared, and the pixels having the smaller absolute values are employed to remove the linear noise component from the original image. Another example of the image correcting means is that in which one of the first linear noise image and the second linear noise image is selected so as to match the properties of the original image, then the linear noise components are removed from the original image. Here, the properties of the original image refers to the properties of the components which are included in the original image, which may be a radiation image of anatomical structures, a solid image used for correction, an image of geometric patterns used for correction, or a test pattern image.

Further, the image correcting means may generate an image, which is the original image from which the linear noise components have been removed employing the first linear noise image, and an image, which is the original image from which the linear noise components have been removed employing the second linear noise image.

The image processing apparatus may further comprise: preliminary processing means, for administering a preliminary process onto the reduced image such that drastic changes in pixel values among pixels which are adjacent to each other in a direction perpendicular to the direction of the linear noise components are reduced. In this case, the noise image extracting means extracts the linear noise image from the reduced image, on which the preliminary process has been administered.

According to the image processing apparatus, the image processing method, and the image processing program of the present invention, first, the reduced image is generated by reducing the original image in the main direction and/or the sub direction. Then, the linear noise image is generated by extracting the linear noise components from the generated reduced image. Next, the generated linear noise image is enlarged to the size of the original image. Finally, the enlarged linear noise image is employed to remove the linear noise components from the original image. Linear noise has very little density variations in the direction that it extends in and therefore the linear noise components which are extracted from the reduced image are substantially equivalent to linear noise components which are extracted from the original image. This fact is utilized to extract the linear noise components by administering a filtering process onto the reduced image. Accordingly, the processing time can be shortened, while the extraction accuracy of the linear noise components is maintained.

A configuration may be adopted, wherein the noise image extracting means comprises: frequency processing means, for extracting high frequency components in a direction perpendicular to the direction of the linear noise components from the reduced image; line dividing means, for dividing pixel lines that extend along the linear noise components within the high frequency components extracted by the frequency processing means into a plurality of divided pixel line segments;

median calculating means, for calculating median values of each of the divided pixel line segments; and noise image generating means, for generating a linear noise image that represents the linear noise components, employing the median values of each of the divided pixel line segments calculated by the median calculating means. In this case, only median values for each of the divided pixel line segments need to be obtained from the reduced image. Therefore, the time required to calculate the median values can be shortened. In addition, the possibility for values that represent anatomical structures being calculated as median values can be minimized. Accordingly, in the case that there are anatomical structures that extend in the same direction as the striped blurs within images of human bodies, removal of the anatomical structures as linear noise can be prevented. That is, only the linear noise components are removed, and deterioration of image quality due to image correction can be prevented.

Further, a configuration may be adopted, wherein the noise image extracting means comprises frequency processing means, for extracting high frequency components in a direction perpendicular to the direction of the linear noise components from the reduced image; first noise image generating means, for generating a first noise image by extracting low frequency components that extend in the direction of the linear noise components from the high frequency components extracted by the frequency processing means; line dividing means, for dividing pixel lines that extend along the linear noise components within the high frequency components extracted by the frequency processing means into a plurality of divided pixel line segments; median calculating means, for calculating median values of each of the divided pixel line segments; and second noise image generating means, for generating a second linear noise image that represents the linear noise components, employing the median values of each of the divided pixel line segments calculated by the median calculating means. In this case, the linear noise image is generated employing the first linear noise image and the second linear noise image. Therefore, the generation of artifacts in the corrected original image can be reduced.

A configuration may be adopted, wherein the noise image extracting means comprises: frequency processing means, for extracting high frequency components and low frequency components in a direction perpendicular to the direction of the linear noise components from the reduced image; first noise image generating means, for generating a first noise image by extracting low frequency components that extend in the direction of the linear noise components from the high frequency components extracted by the frequency processing means; line dividing means, for dividing pixel lines that extend along the linear noise components within the low frequency components extracted by the frequency processing means into a plurality of divided pixel line segments, the lengths of which are twice or greater than the lengths of lines which may be present within anatomical structures; median calculating means, for calculating median values of each of the divided pixel line segments; and second noise image generating means, for generating a second linear noise image that represents the linear noise components, employing the median values of each of the divided pixel line segments calculated by the median calculating means; and wherein: the image correcting means removes the linear noise components from the original image, employing a linear noise image which is generated from the first noise image and the second noise image, and which has been enlarged by the image enlarging means. In this case, the fact that there is a high probability that components within images that represent anatomical structures are low frequency components is utilized, to reduce the generation of artifacts due to the correction.

A configuration may be adopted, wherein the image correcting means compares the absolute values of the pixel values of the first linear noise image and the second linear noise image, and employs the pixels having the smaller absolute values to remove the linear noise component from the original image. In this case, components which are highly likely to be linear noise components can be employed to generate the linear noise image. Therefore, artifacts due to correction can be reduced.

A configuration may be adopted, wherein the image correcting means selects one of the first linear noise image and the second linear noise image so as to match the properties of the original image, then removes the linear noise components from the original image. Thereby, in the case that there are no short linear components that represent anatomical structures in the original image, the first linear noise image may be selected as the linear noise image which is employed to correct the original image, and in the case that short linear components that represent anatomical structures are included in an original image, the second linear noise image may be selected as the linear noise image which is employed to correct the original image, and artifacts can be reduced.

A configuration may be adopted, wherein the image correcting means generates an image, which is the original image from which the linear noise components have been removed employing the first linear noise image, and an image, which is the original image from which the linear noise components have been removed employing the second linear noise image. In this case, a plurality of corrected images which have been processed differently can be provided.

A configuration may be adopted, wherein preliminary processing means, for administering a preliminary process onto the reduced image such that drastic changes in pixel values among pixels which are adjacent to each other in a direction perpendicular to the direction of the linear noise components are reduced; and wherein: the noise image extracting means extracts the linear noise image from the reduced image, on which the preliminary process has been administered. In this case, the generation of ringing components at the locations at which pixel values change drastically when frequency processes are administered by the frequency processing means can be prevented. Thereby, artifacts can be reduced.

Note that the program of the present invention may be provided being recorded on a computer readable medium. Those who are skilled in the art would know that computer readable media are not limited to any specific device and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of the present invention. Additionally, computer instructions include, but are not limited to: source, object, and executable code, and can be in any language, including higher level languages, assembly language, and machine language.

DESCRIPTION OF THE PREFERRED EMBODIMENTS

Figure 1:
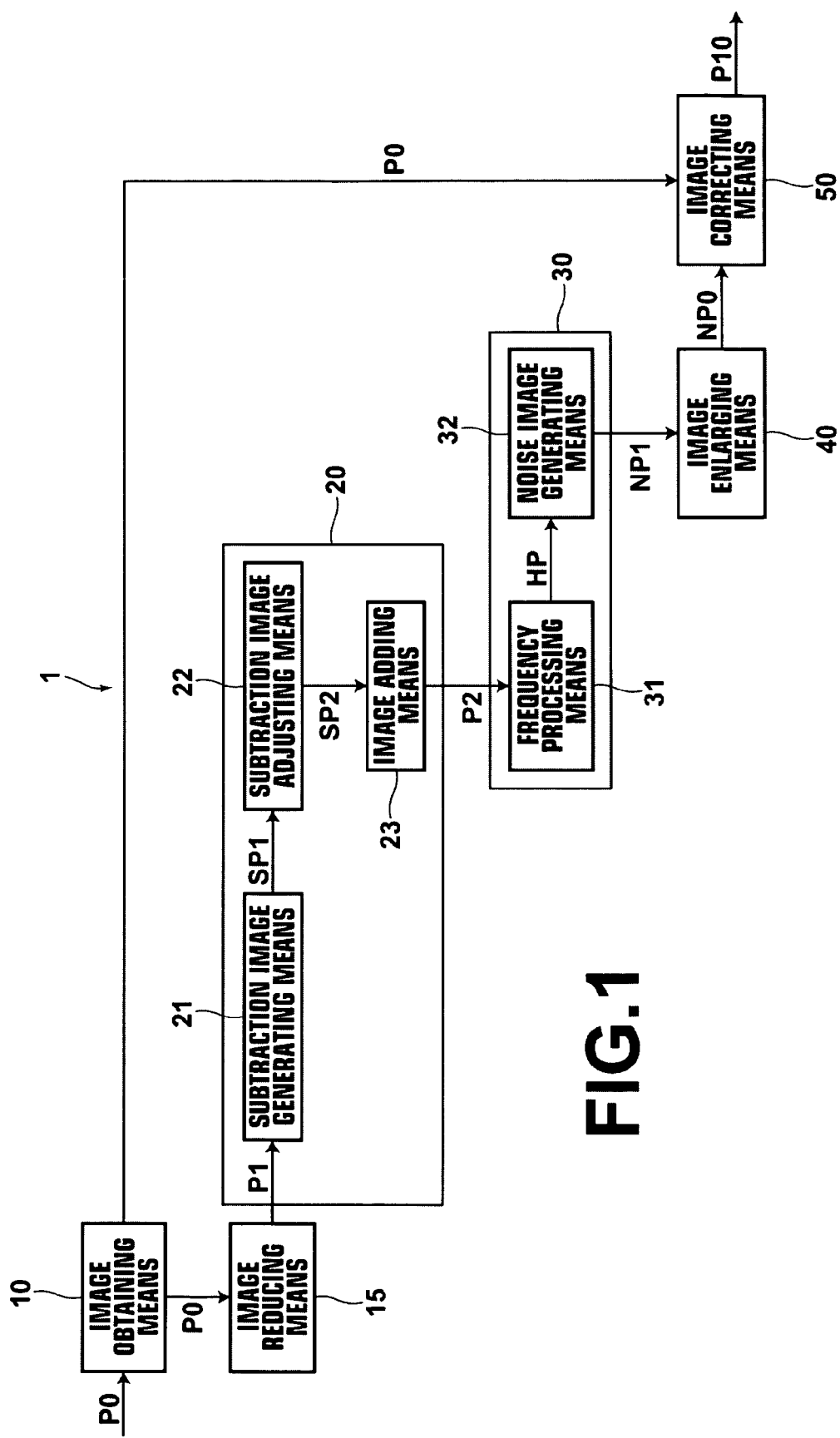
FIG. 1 is a block diagram that illustrates the configuration of an image processing apparatus according to a preferred embodiment of the present invention.

Hereinafter, embodiments of the present invention will be described with reference to the attached drawings. FIG. 1 is a schematic diagram that illustrates the configuration of a radiation image processing apparatus 1 according to a preferred embodiment of the present invention. Note that the radiation image processing apparatus 1 such as that illustrated in FIG. 1 is realized by executing a radiation image processing program, which is recorded in an auxiliary memory device, on a computer (a personal computer, for example). The radiation image processing program may be recorded on data recording media such as CD-ROM's, or distributed via networks such as the Internet, and then installed in the computer.

The radiation image processing apparatus 1 is equipped with: an image obtaining means 10, an image reducing means 15, a preliminary processing means 20, a noise image extracting means 30, an image enlarging means 40, and an image correcting means 50. The image obtaining means 10 obtains radiation images P0 which are obtained by thoracic imaging, obtained by a mammography apparatus and the like, as digital data.

Figure 2:
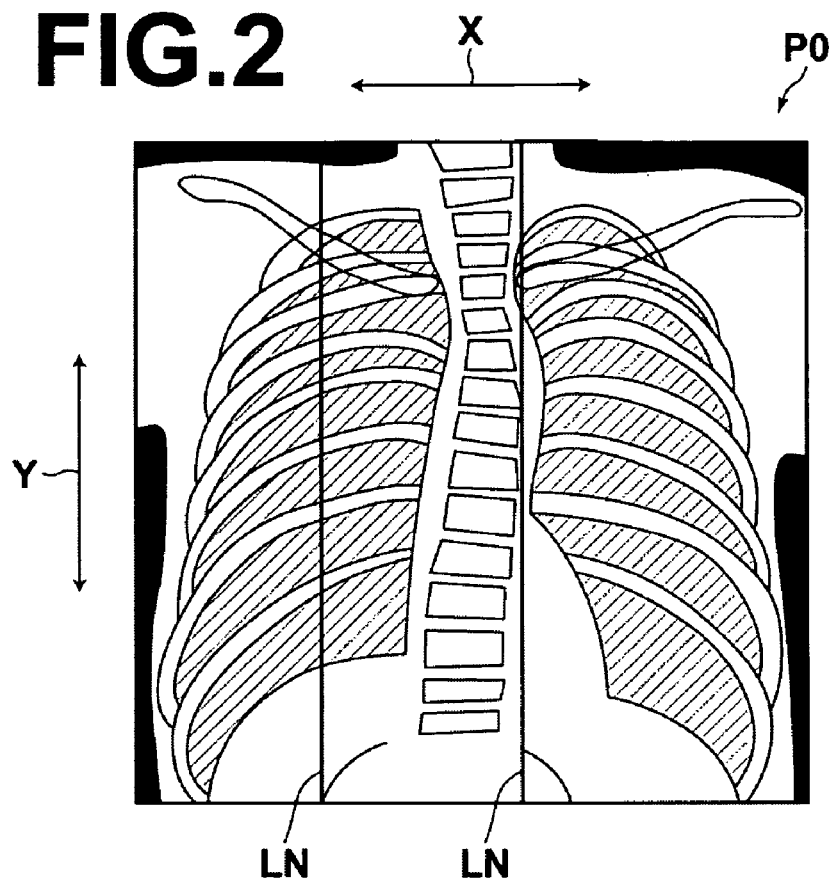
FIG. 2 is a diagram that illustrates an example of a radiation image obtained by an image obtaining means of FIG. 1.

The image reducing means 15 generates reduced images P1, by reducing the radiation images P0 in a main direction or a sub direction. For example, FIG. 2 illustrates an example in which a radiation image P0 is reduced in the sub direction (the direction indicated by arrow Y). Note that the image reducing means 15 reduces the radiation images P0 by a reduction rate, which is set in advance.

Figure 3:
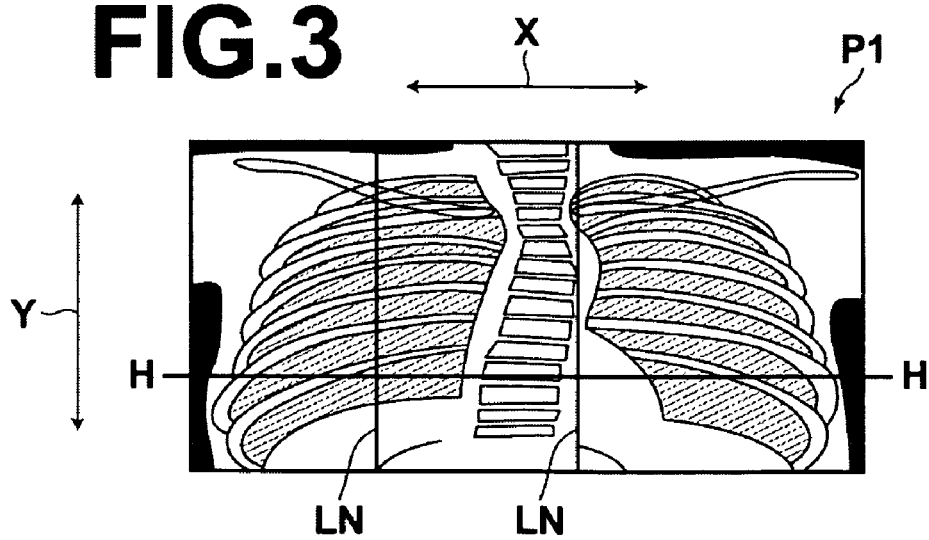
FIG. 3 is a diagram that illustrates how a radiation image is reduced by an image reducing means of FIG. 1.
Figure 4A:
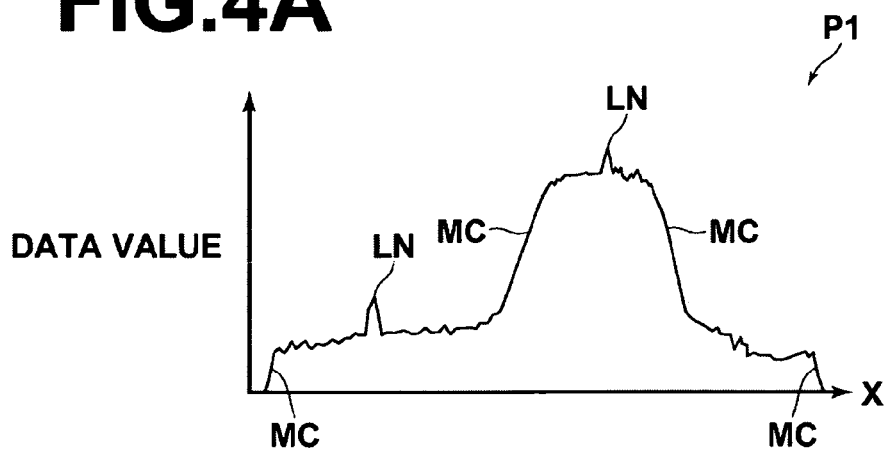
FIG. 4A is a graph that illustrates an example of an image which has undergone a preliminary process by a preliminary processing means of FIG. 1.
Figure 4B:
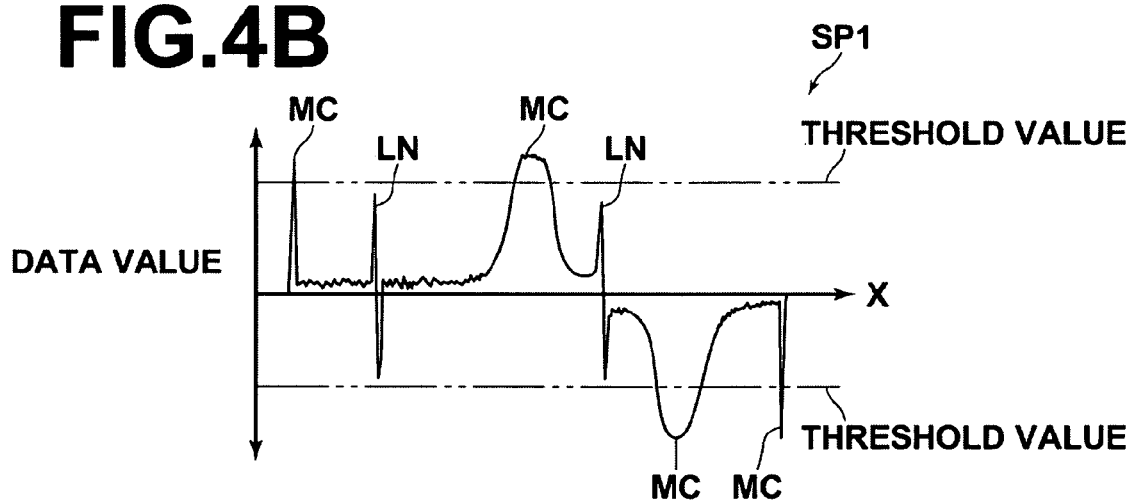
FIG. 4B is a graph that illustrates an example of a subtraction image which is generated by the preliminary processing means of FIG. 1.

The preliminary processing means 20 illustrated in FIG. 1 administers a preliminary process onto the reduced images P1 such that drastic changes in pixel values among pixels which are adjacent to each other in a direction perpendicular to the direction of linear noise are reduced. The preliminary processing means 20 is equipped with: a subtraction image generating means 21, a subtraction image adjusting means 22, and an image adding means 23. The subtraction image generating means 21 generates subtraction images SP1, by calculating the differences among pixels which are adjacent to each other in a direction perpendicular to a direction in which linear noise components LN are extracted from. For example, in the case that linear noise components LN that extend in the sub direction (the direction indicated by arrow Y) are to be extracted and removed, the subtraction image generating means 21 calculates the differences among pixel values of pixels which are adjacent to each other in the main direction (the direction indicated by arrow X) from a reduced image P1 which is represented by FIG. 4A (FIGS. 4A through 7B are graphs that represent the pixel values along line H-H of FIG. 3). Thereby, a subtraction image SP1 which has the difference values as pixel values as illustrated in FIG. 4B is generated.

Figure 5:
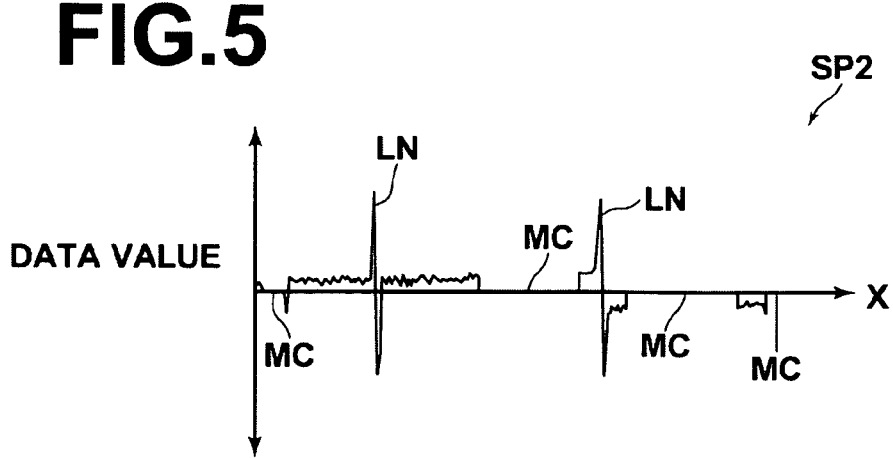
FIG. 5 is a graph that illustrates an example of a subtraction image which has been adjusted by the preliminary processing means of FIG. 1.
Figure 6:
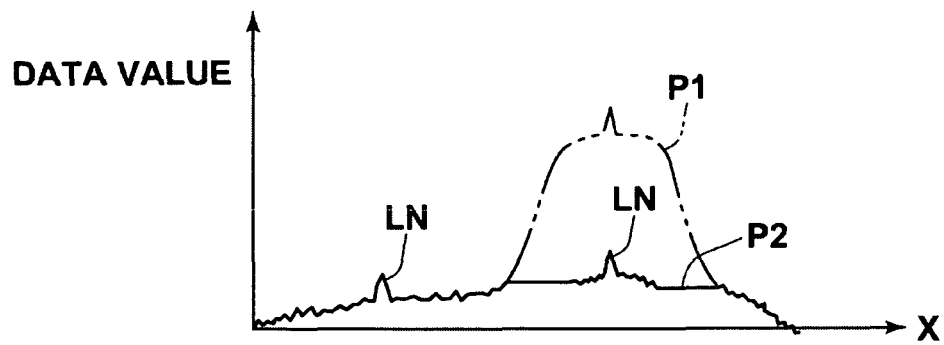
FIG. 6 is a graph that illustrates the manner in which a cumulative addition process is administered onto a subtraction image by the preliminary processing means of FIG. 1.

The subtraction image adjusting means 22 generates adjusted subtraction images SP2, by adjusting the pixel values of the subtraction images SP1 such that when the pixel values are greater than or equal to a set pixel threshold value (clip value), the pixel values are adjusted to a predetermined set value (0, for example). That is, the portions at which pixel values of the subtraction image SP1 change drastically have large pixel values (difference values) as denoted by the portions MC in FIG. 4B. The subtraction image adjusting means 22 adjusts the pixel values which are greater than the set pixel threshold value to the predetermined value, and adjusts the pixel values of the portions MC to 0, as illustrated in FIG. 5, for example. Here, the pixels that represent monotonous increases and monotonous decreases and include pixel values which are greater than the set pixel threshold value within the subtraction image SP1 are similarly adjusted to the predetermined value. Thereby, the regions at which pixel values change drastically can be changed to regions at which the changes in pixel values are gradual as a whole.

The image adding means 23 cumulatively adds the pixel values of the adjusted subtraction images SP2 which have been adjusted by the subtraction image adjusting means 22, to generate preliminarily processed reduced images P2. Specifically, the image adding means 23 repeatedly adds the pixel values of pixels of the adjusted subtraction images SP2 illustrated in FIG. 5 which are adjacent to each other in the main direction (the direction indicated by arrow X) so as to reconstruct radiation images P0 prior to generation of the subtraction images SP1, to obtain preliminarily processed reduced images P2 such as that illustrated in FIG. 6. At this time, because the clip process has been administered by the subtraction image adjusting means 22, the portions at which pixel values change drastically in the main direction (the direction indicated by arrow X) of the original reduced images P1 have gradual changes in the reduced images P2.

Figure 7A:
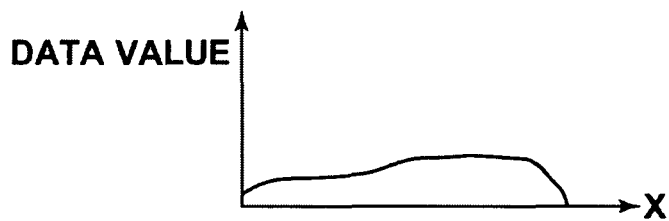
FIG. 7A is a graph that illustrates an example of low frequency components which are extracted by a frequency processing means of FIG. 1.
Figure 7B:
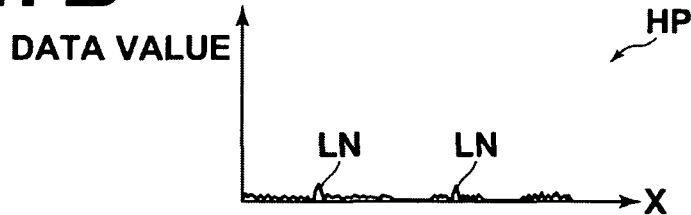
FIG. 7B is a graph that illustrates an example of high frequency components which are extracted by the frequency processing means of FIG. 1.

The noise image extracting means 30 of FIG. 1 extracts linear noise components LN that extend in the direction of arrow Y by administering a filter process onto the reduced images P2. The noise image extracting means 30 is equipped with: a frequency processing means 31, and a noise image generating means 32. The frequency processing means 31 extracts high frequency components HP in the direction (the direction indicated by arrow X) perpendicular to the direction of the linear noise components LN from the reduced images P2, on which the preliminary process has been administered. Specifically, the frequency processing means 31 administers a low pass filter process onto the reduced images P2 to extract low frequency components as illustrated in FIG. 7A. Then, the extracted low frequency components are removed from the reduced images P2, to obtain the high frequency components HP as illustrated in FIG. 7B. At this time, because the preliminary process has been administered by the preliminary processing means 20, the generation of ringing at portions at which pixel values change drastically can be prevented.

Figure 8:
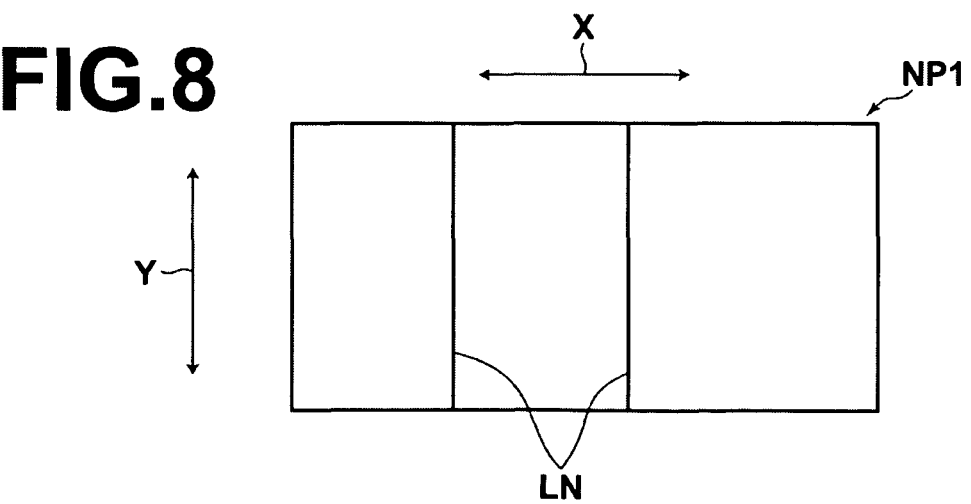
FIG. 8 is a graph that illustrates an example of a linear noise image which is generated by a noise image generating means of FIG. 1.
Figure 9:
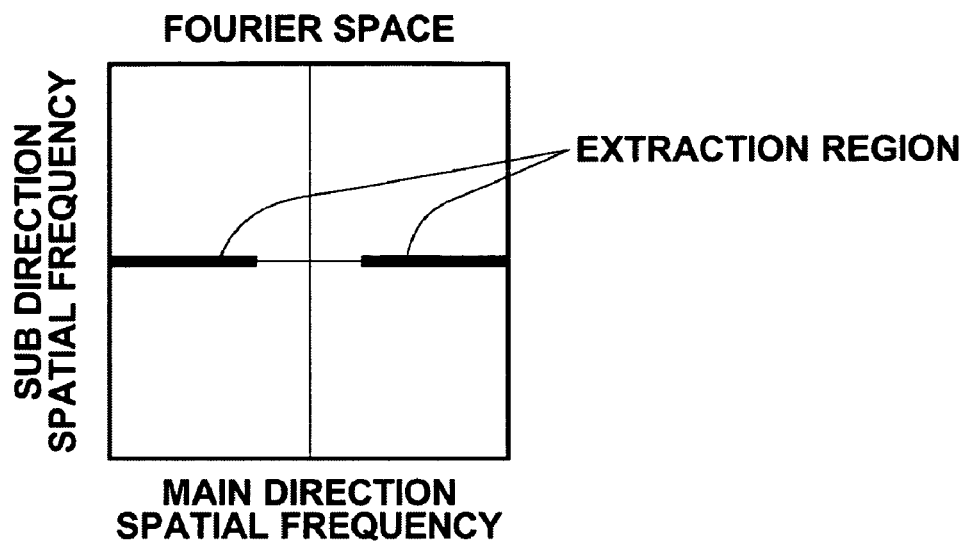
FIG. 9 is a graph that illustrates the frequency components which are included in the linear noise image of FIG. 8 in a Fourier space.

The noise image generating means generates linear noise images NP1 such as that illustrated in FIG. 8, by extracting low frequency components in the reducing direction (the direction indicated by arrow Y) from the high frequency component images extracted by the frequency processing means 31.

Figure 10:
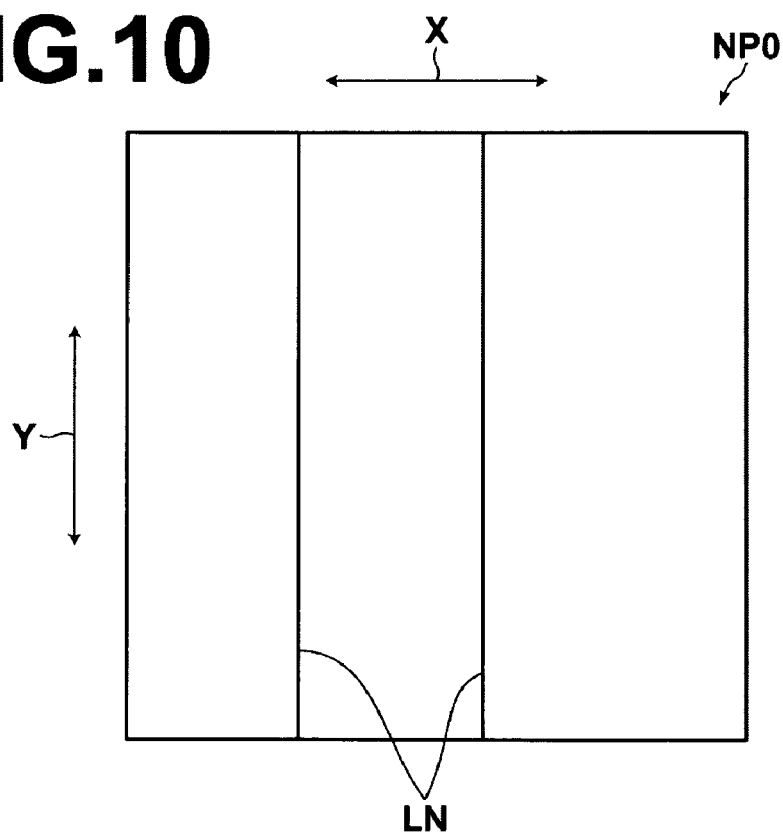
FIG. 10 is a diagram that illustrates an example of a linear noise image which has been enlarged by an image enlarging means of FIG. 1.

The image enlarging means 40 of FIG. 1 enlarges the linear noise images NP1, which have been generated by the noise image generating means 32, to the image size of the radiation images P0. That is, the image enlarging means 40 enlarges the linear noise images NP1 at an enlargement rate corresponding to the reduction rate of the image reducing means 15, to generate linear noise images NP0 such as that illustrated in FIG. 10.

Figure 11:
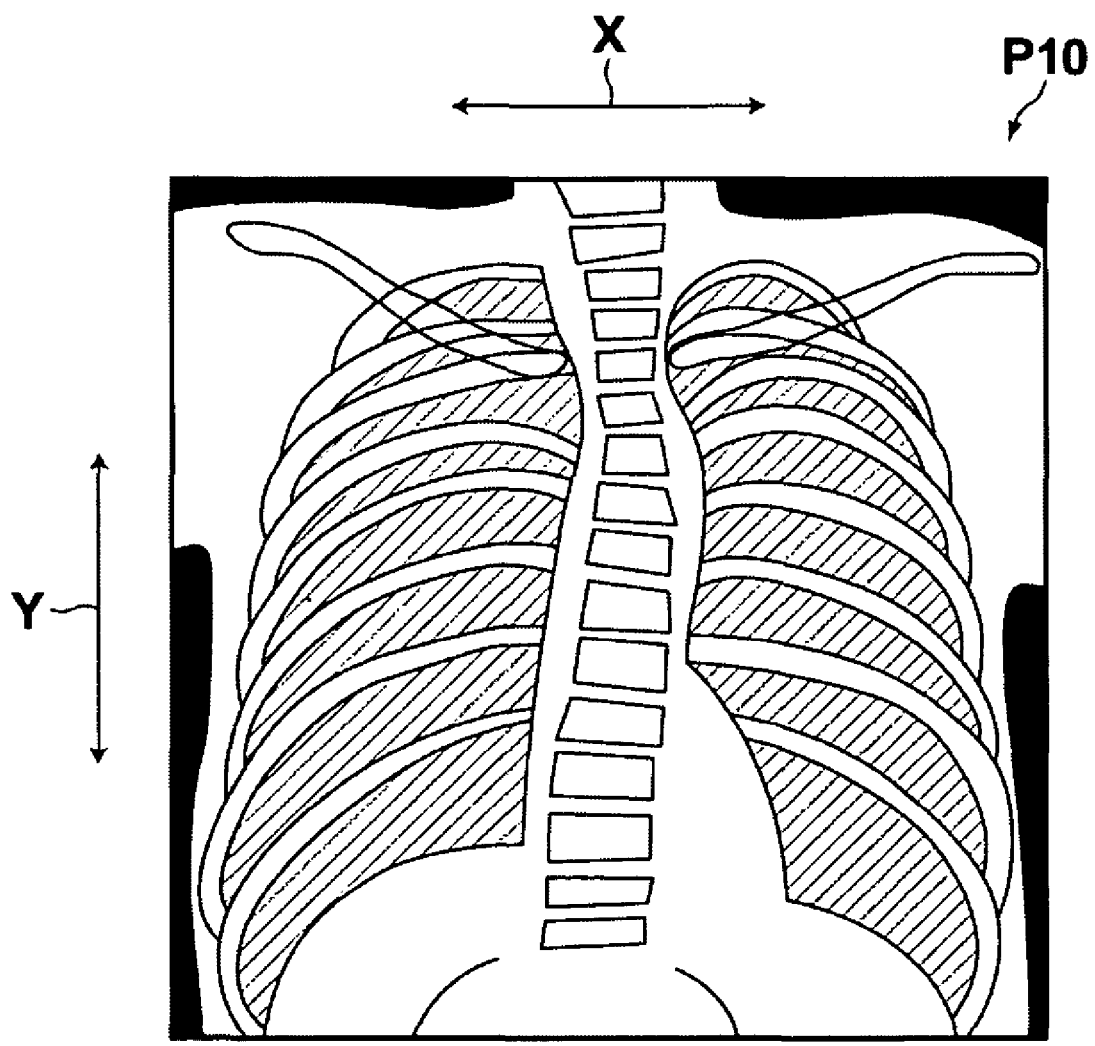
FIG. 11 is a diagram that illustrates an example of a radiation image which has been corrected by an image correcting means of FIG. 1.

The image correcting means 50 employs the linear noise images NP0, which have been enlarged by the image enlarging means 40, to perform correction to remove linear noise from the radiation images P0. Specifically, the image correcting means 50 calculates differences between the radiation images P0 and the linear noise images NP0, and obtains corrected radiation images P10 such as that illustrated in FIG. 11.

Figure 12:
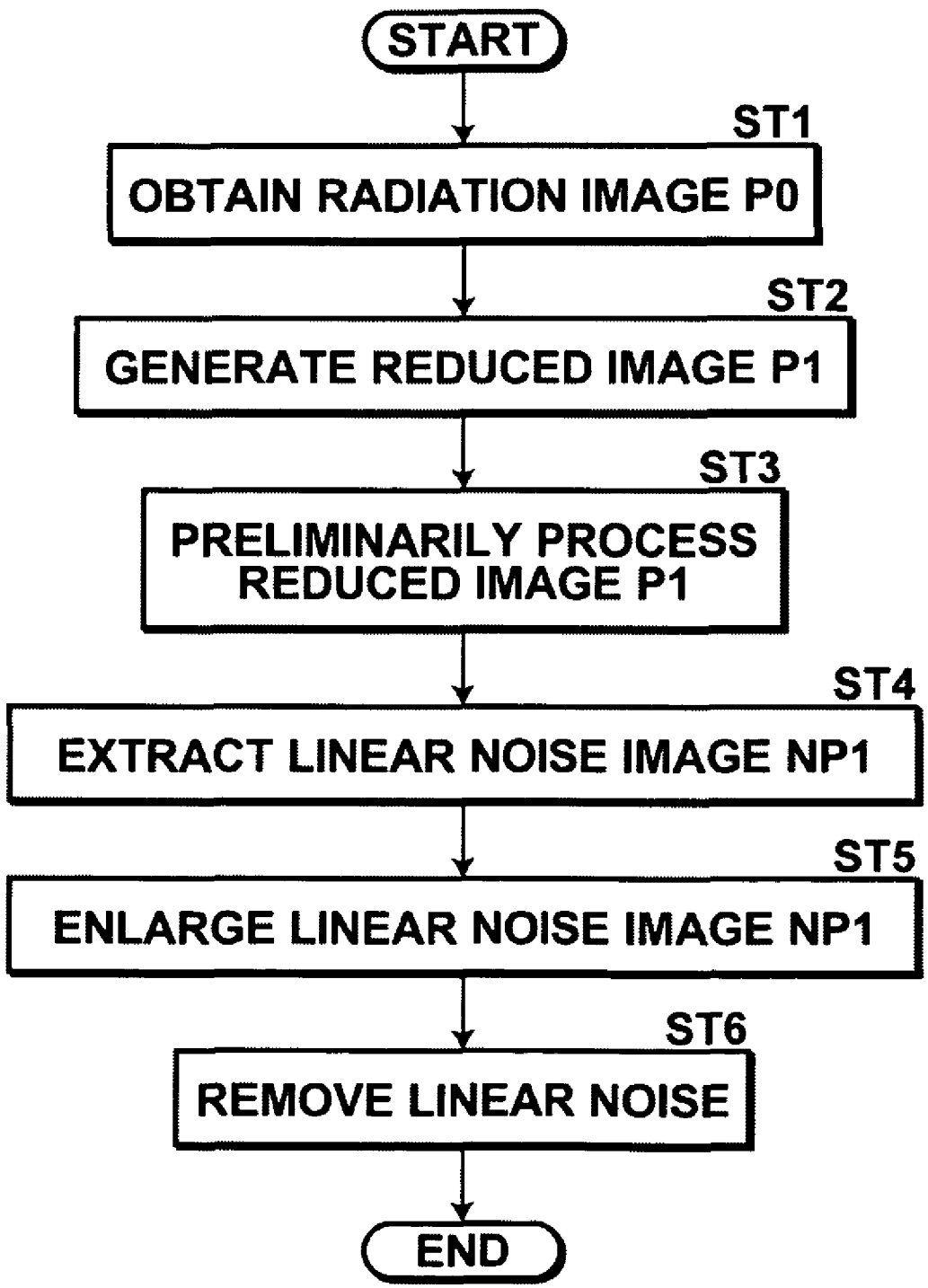
FIG. 12 is a flow chart that illustrates a preferred embodiment of a radiation image processing method of the present invention.

FIG. 12 is a flow chart that illustrates a preferred embodiment of a radiation image processing method of the present invention. The radiation image processing method of the present invention will be described with reference to FIG. 1 through FIG. 12. First, the image obtaining means 10 obtains a radiation image P0 (step ST1, refer to FIG. 2). Next, the image reducing means 15 reduces the radiation image P0 to generates a reduced image P1 (step ST2, refer to FIG. 3). Then, the preliminary processing means 20 administers the preliminary process onto the reduced image P1 (step ST3, refer to FIG. 4 through FIG. 6)

Next, the noise image generating means 30 generates a linear noise image, by extracting linear noise components LN (step ST4, refer to FIG. 7 through FIG. 10). Specifically, a linear noise image NP1 is extracted, by extracting high frequency components HP that extend in the direction of arrow X from a preliminarily processed reduced image P2 (refer to FIGS. 7A and 7B), then extracting low frequency components that extend in the direction indicated by arrow Y from the extracted high frequency components HP (refer to FIG. 8 and FIG. 9). Thereafter, the image enlarging means 40 enlarges the linear noise image NP1 to the image size of the radiation image P0 to generate a linear noise image NP0 (step ST5, refer to FIG. 10). Finally, the linear noise image NP0 is subtracted from the radiation image P0, to obtain a corrected radiation image P10 (step ST6, refer to FIG. 11).

By employing the linear noise image NP0 by employing the reduced image P1, which is a reduced image of the radiation image P0 in this manner, the extraction accuracy of the linear noise components LN is maintained, while shortening the processing speed of the extracting process. That is, when filter processes are administered onto radiation images P0, it is necessary to employ filters of sizes that match the image sizes of the radiation images P0, which causes the filter process to consume a large amount of time. Therefore, by extracting the linear noise image NP0 from the reduced image P1, the filter process administered by the noise image extracting means 30 in the direction of the linear noise can be performed employing a small filter. Therefore, the processing time can be shortened. Here, the extraction results when the linear noise components LN are extracted from the radiation image P0 and the extraction results when the linear noise components LN are extracted from the reduced image P1 are substantially the same.

Figure 13:
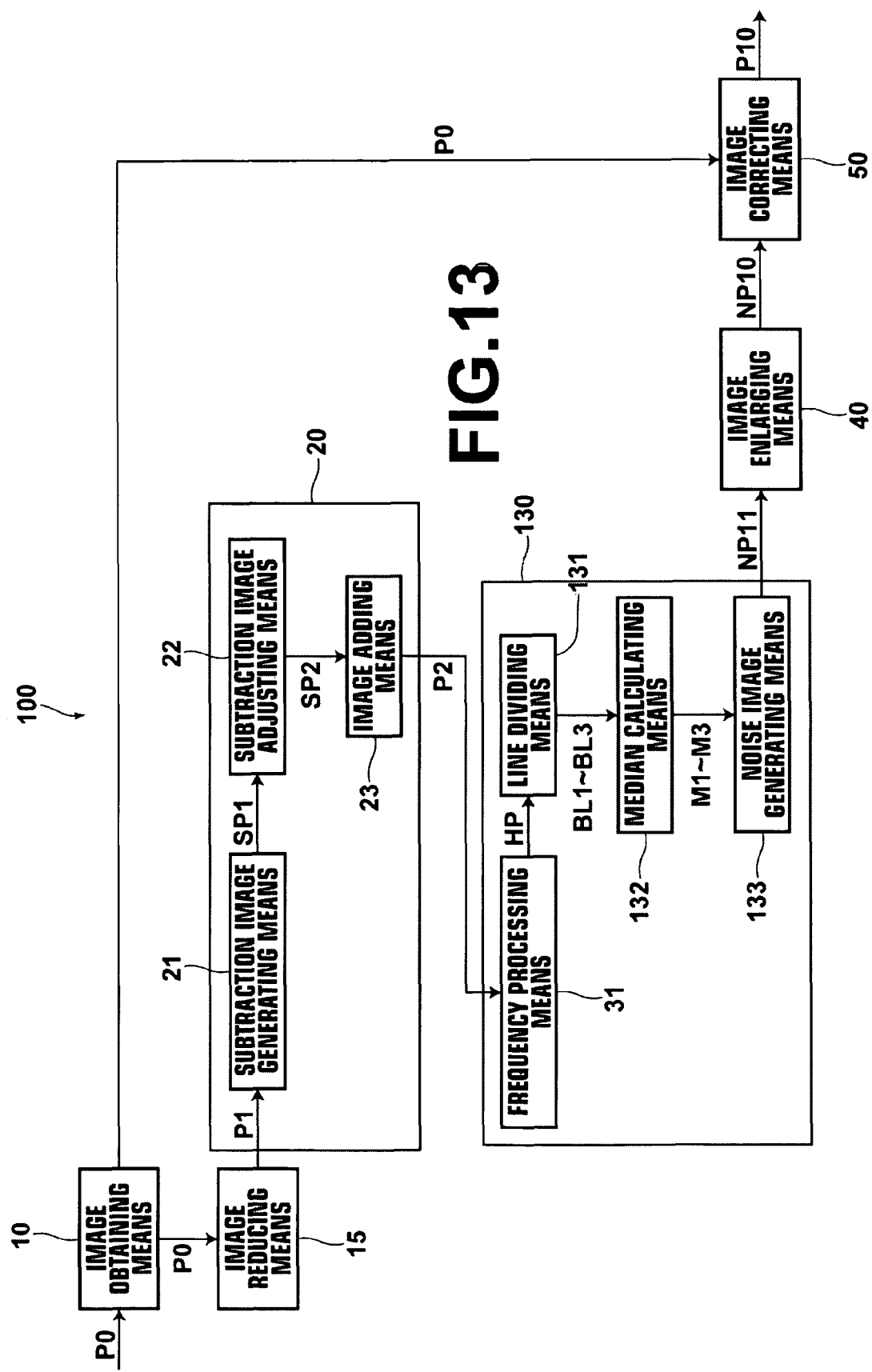
FIG. 13 is a block diagram that illustrates a radiation image processing apparatus according to a second embodiment of the present invention.

FIG. 13 is a block diagram that illustrates a radiation image processing apparatus 100 according to a second embodiment of the present invention. The radiation image processing apparatus 100 differs from the radiation image processing apparatus 1 of FIG. 1 in that it is equipped with a noise image extracting means 130 instead of the noise image extracting means 30. The noise image extracting means 130 will be described with reference to FIG. 13. Note that elements of the noise image extracting means 130 which are the same as those of the noise image extracting means 30 of FIG. 1 will be denoted with the same reference numerals, and detailed descriptions thereof will be omitted. The noise image extracting means 130 of FIG. 13 differs from the noise image extracting means 30 of FIG. 1 in that it employs median values to generate linear noise images NP10.

Figure 14:
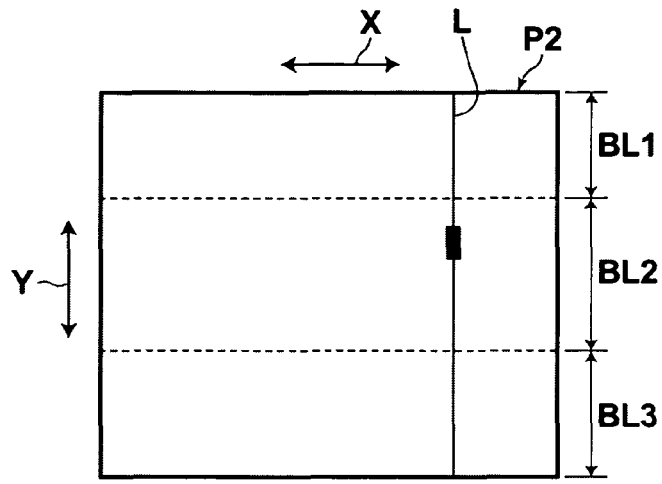
FIG. 14 is a schematic diagram that illustrates the manner in which a pixel line is divided by a line dividing means of FIG. 13.

The noise image extracting means 130 is equipped with: the frequency processing means 31, a line dividing means 131, a median calculating means 132, and a noise image generating means 133. The line dividing means 131 divides each pixel line that within the high frequency components HP extracted by the frequency processing means 31 that extends in the direction of arrow Y into a plurality of divided pixel line segments BL1 through BL3. Specifically, when extracting linear noise that extends in the sub direction (the direction indicated by arrow Y), the line dividing means 131 divides each pixel line L that extends in the sub direction into three line segments BL1 through BL3, for example, as illustrated in FIG. 14.

At this time, the line dividing means sets the length of each of the divided line segments BL1 through BL3 to be twice or longer than lines that may be present within anatomical structures. This length may be obtained empirically or statistically, and set in advance.

That is, the number of pixels in each divided pixel line segment is a parameter which is optimized such that no barriers to diagnosis using a radiation image P10, from which stripes have been removed, occur, and such that no visually recognizable strips remain. In other words, the number of pixels in each divided pixel line segment is optimized such that linear noise components LN that may cause barriers to diagnosis are removed, while minimizing deterioration in image quality caused by anatomical structures being extracted as linear noise components LN. The optimal number of pixels in each divided pixel line segment varies depending on the thickness of the stripes to be removed. In the present example, a case has been described in which the divided pixel line segments BL1 through BL3 are generated. However, the number of divided pixel line segments varies depending on the number of pixels therein, and there are cases in which the number of divided pixel line segments is 1, that is, cases in which the pixel lines are not divided.

Figure 15:
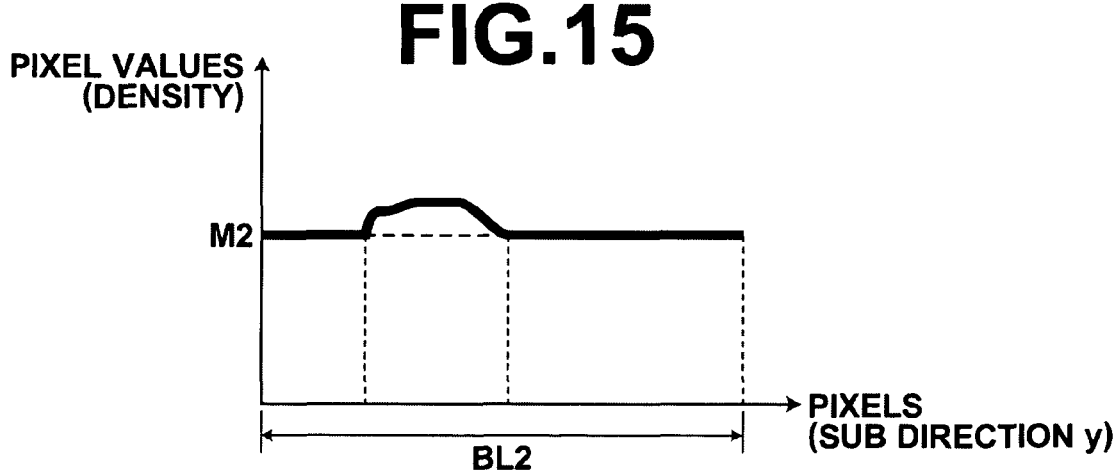
FIG. 15 is a graph that illustrates the manner in which a median value is calculated for each divided pixel line segment by a median calculating means of FIG. 13.

The median calculating means 132 of FIG. 13 calculates median values M1 through M3 for each of the divided pixel line segments BL1 through BL3, which have been divided by the line dividing means 131. That is, the median calculating means 132 calculates median values using the number of pixels within each of the divided pixel line segments BL1 through BL3 as a calculation range. At this time, the divided pixel line segments BL1 through BL3 are of lengths greater than or equal to twice the length of anatomical structures that may be present. Therefore, pixel values that represent anatomical structures will not be calculated as median values M1 through M3. For example, in the case that pixel values (densities) that represent an anatomical structure is present along a pixel line that extends in the sub direction (the direction indicated by arrow Y) as illustrated in FIG. 14, the pixel values that represent the anatomical structure will not be positioned at the midpoint of the pixel values of pixels included in pixel line segment BL2, as illustrated in FIG. 15, and therefore will not be calculated as the median value M2. In other words, the median calculating means 132 will calculate pixel values that represent linear noise components LN as the median values M2.

Figure 16:
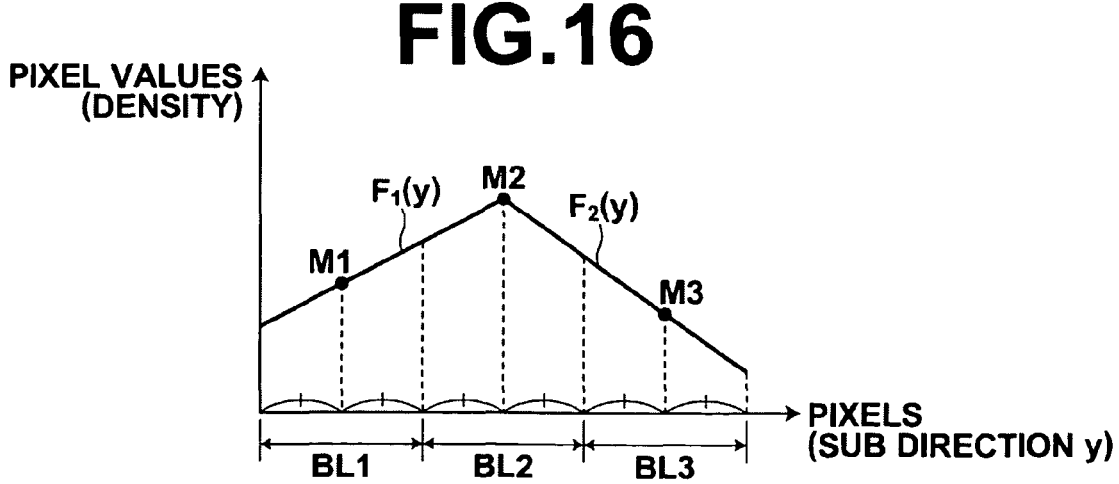
FIG. 16 is a graph that illustrates an example of functions which are derived by a noise image generating means of FIG. 13 when generating a linear noise image from median values.

The noise image generating means 133 of FIG. 13 employs the median values M1 through M3, calculated by the median calculating means 132 for each of the divided pixel line segments BL1 through BL3, to generate a linear noise image NP11 that represents linear noise components LN. Specifically, the noise image generating means 133 designates the pixel values of the pixels at the centers of each of the divided pixel line segments BL1 through BL3 as median values M1 through M3. Then, the noise image generating means 133 connects the plurality of median values M1 and M2 and the plurality of median values M2 and M3 with lines, as illustrated in FIG. 16. Next, the noise image generating means 133 generates a pixel function $F1(y)$ and a pixel function $F2(y)$ (y represents pixels in the sub direction) that represent the pixel values of each pixel along the sub direction (the direction indicated by arrow Y) for each pixel line L. Thereafter, the noise image generating means 133 calculates pixel values for each pixel by employing the generated pixel functions $F1(y)$ and $F2(y)$, to generate the linear noise image NP11.

Note that in the example illustrated in FIG. 16, functions that connect the median values M1, M2, and M3 with lines are generated. However, the present invention is not limited to such a configuration, and the linear noise image NP11 may be generated employing a function $F(y)$ that connects the median values M1 through M3 with a single curve.

In cases that the median values M1 through M3 are employed to extract the linear noise components LN in this manner as well, the reduced images P2 are employed during the extraction process. Thereby, the median calculating range can be set to be small, and therefore the processing time can be shortened, while maintaining the extraction accuracy of the linear noise components LN. Further, the lengths of each of the divided pixel line segments BL1 through BL3 are twice or greater than the lengths of lines which are included in anatomical structures. Therefore, in the case that there are anatomical structures that extend in the same direction as the striped blurs within images of human bodies, removal of the anatomical structures by the image correcting means 50 as linear noise components LN can be prevented, when correcting radiation images.

Figure 17:
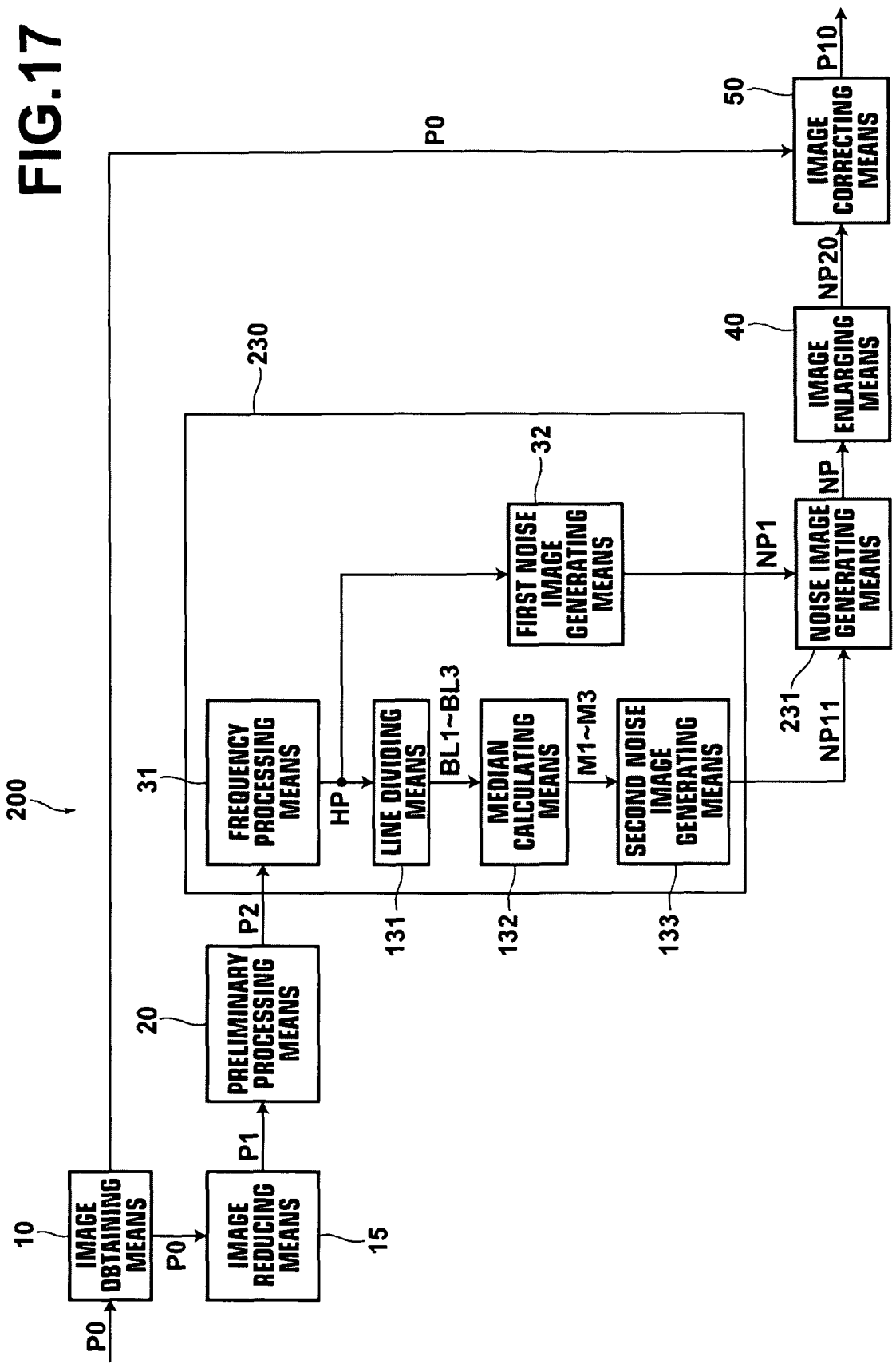
FIG. 17 is a block diagram that illustrates a radiation image processing apparatus according to a third embodiment of the present invention.

FIG. 17 is a block diagram that illustrates a radiation image processing apparatus 200 according to a third embodiment of the present invention. The radiation image processing apparatus 200 differs from the radiation image processing apparatus 1 of FIG. 1 in that it is equipped with a noise image extracting means 230 instead of the noise image extracting means 30. The noise image extracting means 230 will be described with reference to FIG. 17. Note that elements of the noise image extracting means 230 which are the same as those of the noise image extracting means 30 of FIG. 1 and the noise image extracting means 130 of FIG. 13 will be denoted with the same reference numerals, and detailed descriptions thereof will be omitted. The noise image extracting means 230 of FIG. 17 differs from the noise image extracting means 30 of FIG. 1 and the noise image extracting means 130 of FIG. 13 in that it generates a linear noise image NP to be used for correction from a first linear noise image NP1 which is generated by a filter process and a second linear noise image NP11 which is generated using median values M1 through M3.

Specifically, the noise image extracting means 230 of FIG. 17 is equipped with: the frequency processing means 31, a first noise image generating means 32, the line dividing means 131. A second noise image generating means 133, and a noise image generating means 231. As described previously, the first noise image generating means 32 generates a first linear noise image NP1 (refer to FIG. 8), and the second noise image generating means 133 generates a second linear noise image NP11 (refer to FIG. 14 through FIG. 16). Then, the noise image generating means 231 generates a linear noise image NP to be used for correction from the first linear noise image NP1 and the second linear noise image NP11.

Here, the noise image generating means 231 compares the absolute values of the pixel values of the first linear noise image NP1 and the second linear noise image NP11, and employs the pixels having the smaller absolute values to generate the linear noise image NP. Generally, the densities (absolute values) of linear noise components LN are low. Therefore, it can be estimated that the pixel values having the smaller absolute values more accurately represent the linear noise components LN. Therefore, the absolute pixel values of each of the pixels in the two linear noise images NP1 and NP11 are compared, and the pixel values having lower absolute values are employed to generate the linear noise image NP to be used for correction. Thereby, artifacts due to correction can be reduced.

Alternatively, the noise image generating means 231 may select one of the first linear noise image NP1 and the second linear noise image NP11 so as to match the type of subject onto which radiation is irradiated, to generate the linear noise image NP. That is, there are radiation images which are more suited for correction using linear noise images generated by a filter process, and radiation images which are more suited for correction using linear noise images generated by a median process. For example, correction may be performed using the first linear noise image NP1 with respect to a radiation image P0 obtained by imaging a subject having many short linear components, and correction may be performed using the second linear noise image NP11 with respect to a radiation image used as a test image, obtained by imaging geometric patterns.

Further, cases in which the noise image generating means 231 generates a single linear noise image NP have been described above. Alternatively, the two linear noise images NP1 and NP11 may both be employed as the linear noise image NP for correction as is. That is, two corrected radiation images P10, which have been corrected using the linear noise image NP1 and the linear noise image NP11 respectively, may be generated.

Figure 18:
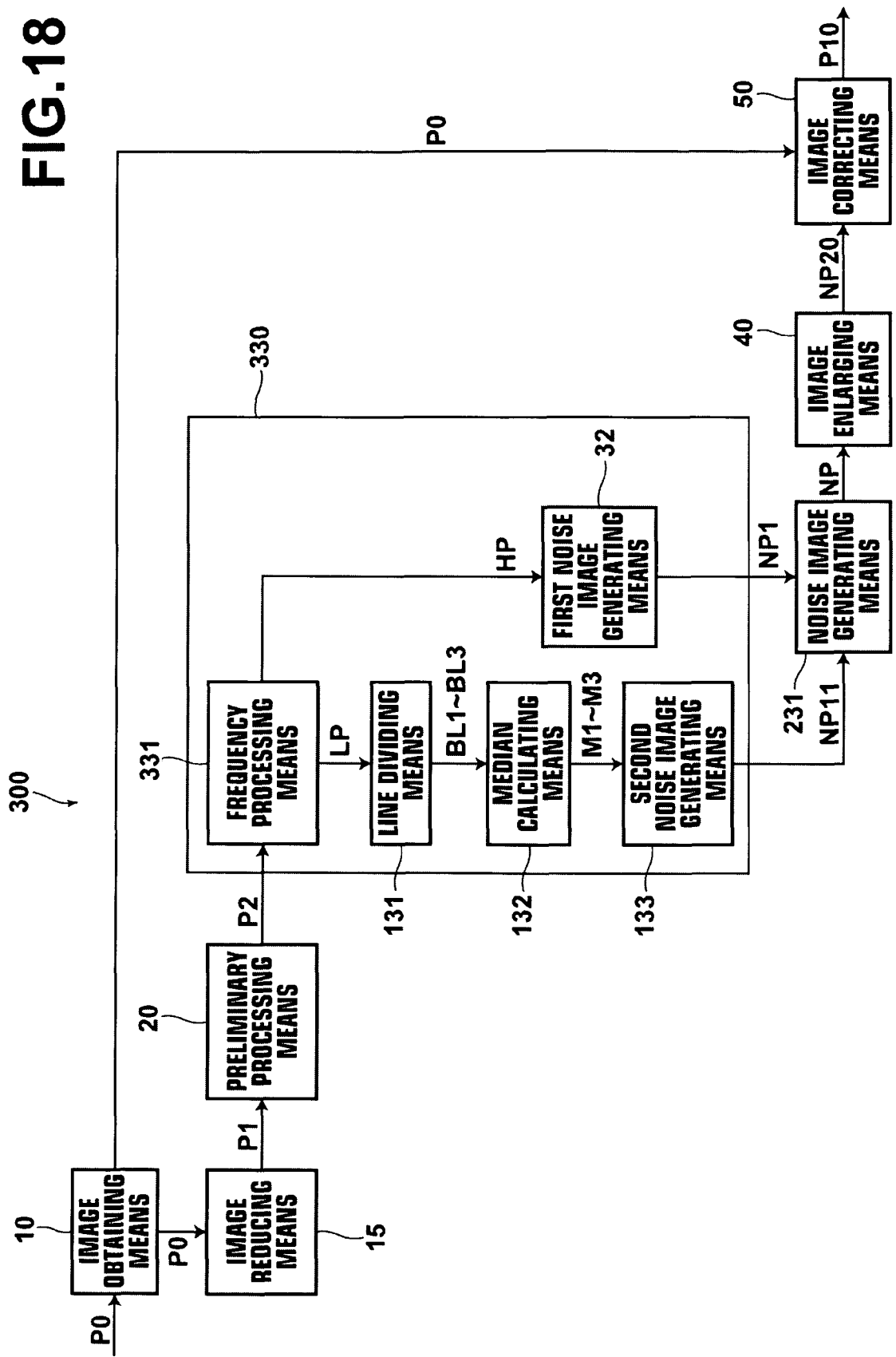
FIG. 18 is a block diagram that illustrates a radiation image processing apparatus according to a fourth embodiment of the present invention.

FIG. 18 is a block diagram that illustrates a radiation image processing apparatus 300 according to a fourth embodiment of the present invention. The radiation image processing apparatus 400 differs from the radiation image processing apparatus 300 of FIG. 17 in that it is equipped with a noise image extracting means 330 instead of the noise image extracting means 230. The noise image extracting means 330 will be described with reference to FIG. 18. Note that elements of the noise image extracting means 330 which are the same as those of the noise image extracting means 230 of FIG. 17 will be denoted with the same reference numerals, and detailed descriptions thereof will be omitted. The noise image extracting means 330 of FIG. 18 differs from the noise image extracting means 230 of FIG. 17 in that it generates linear noise images by separating reduced images P2 into frequency components, and by administering different processes onto each of the frequency components.

A frequency processing means 331 of FIG. 18 functions to extract both high frequency components HP and low frequency components LP in the direction of arrow X. The first noise image generating means 32 generates the first linear noise images NP1 employing the high frequency components HP. On the other hand, the line dividing means 131, the median calculating means 132, and the second noise image generating means 133 generate the second linear noise images NP11 using the low frequency components LP. Note that in this case as well, the noise image generating section 231 generates noise images NP employing the two linear noise images NP1 and NP11, as described with reference to FIG. 17. The image enlarging means 40 enlarges the noise images NP, and the image correcting means 50 subtracts the noise images NP from the original radiation images P0, to generate corrected radiation images P10.

The two frequency components are extracted from the reduced images P2 and different extraction processes are administered on each of the frequency components to extract the linear noise components LN in this manner. Thereby, the extraction process for linear noise components LN can be performed according to the properties of the linear noise components LN within each of the frequency components. That is, the first linear noise images NP1 are generated by extracting the linear noise components LN from the high frequency components using the filter process, which is capable of extracting linear noise components LN even if the densities thereof vary somewhat. Meanwhile, the second linear noise images NP11 are generated while taking the fact that anatomical structures are often included in low frequency components into consideration, by extracting the linear noise components LN from the low frequency components using the median values M1 through M3, which is capable of preventing erroneous extraction of short linear components as linear noise components LN. Accordingly, artifacts can be reduced.

According to the embodiments described above, first, the reduced images P1 are generated by reducing the radiation images P0 in the main direction and/or the sub direction. Then, the linear noise images NP are generated by extracting the linear noise components LN from the generated reduced images P1 (P2). Next, the generated linear noise images NP are enlarged to the size of the radiation images P0. Finally, the enlarged linear noise images NP are employed to remove the linear noise components LN from the radiation images P0. The linear noise components LN have very little density variations in the direction that linear noise extends in and therefore the linear noise components LN which are extracted from the reduced images P1 are substantially equivalent to linear noise components LN which are extracted from the radiation images P0. Based on this knowledge, the linear noise components LN are extracted from the reduced images P1, which are the radiation images P0 reduced in the extraction direction. Accordingly, the processing time required to extract the linear noise components LN can be shortened, while the extraction accuracy of the linear noise components LN is maintained.

As illustrated in FIG. 1, the noise image extracting means 30 comprises: the frequency processing means 31, for extracting the high frequency components HP in the direction of arrow X from the reduced images P1 (P2); and the noise image extracting means 32, for generating the linear noise images NP1 by extracting the low frequency components in a direction perpendicular to the direction that the linear noise extends in from the high frequency components HP. Thereby, filter processes can be performed with filter sizes that match the sizes of the reduced images P1, and accordingly, the processing time can be shortened.

As illustrated in FIG. 13 through FIG. 16, the noise image extracting means 130 comprises: the frequency processing means 31, for extracting the high frequency components HP in the direction of arrow X from the reduced images P1 (P2); the line dividing means 131, for dividing pixel lines L that extend in the direction of arrow X within the high frequency components HP extracted by the frequency processing means 31 into a plurality of divided pixel line segments BL1 through BL3; the median calculating means 132, for calculating median values M1 through M3 of each of the divided pixel line segments BL1 through BL3; and the noise image generating means 133, for generating linear noise images NP11 that represent the linear noise components LN, employing the median values M1 through M3 of each of the divided pixel line segments BL1 through BL3 calculated by the median calculating means 132. The median calculating range can be made small, and the time required to calculate the median values can be shortened. In addition, the possibility for values that represent anatomical structures being calculated as the median values M1 through M3 can be minimized. Accordingly, in the case that there are anatomical structures that extend in the same direction as the striped blurs within images of human bodies, removal of the anatomical structures as linear noise can be prevented. That is, only the linear noise components LN are removed, and deterioration of image quality due to image correction can be prevented.

Further, as illustrated in FIG. 17, the noise image extracting means 230 comprises the frequency processing means 31, for extracting high frequency components HP in the direction of arrow X from the reduced images P1 (P2); the first noise image generating means 32, for generating the first noise images NP1 by extracting low frequency components that extend in the direction of arrow Y from the high frequency components HP extracted by the frequency processing means 31; the line dividing means 131, for dividing pixel lines L that extend in the direction of arrow X within the high frequency components HP extracted by the frequency processing means 31 into a plurality of divided pixel line segments BL1 through BL3; the median calculating means 132, for calculating median values M1 through M3 of each of the divided pixel line segments BL1 through BL3; and the second noise image generating means 133, for generating the second linear noise images NP11 that represent the linear noise components LN, employing the median values M1 through M3 of each of the divided pixel line segments BL1 through BL3 calculated by the median calculating means 132. The linear noise images NP are generated employing the first linear noise images NP1 and the second linear noise images NP11. In this case, the linear noise images NP are generated using the first linear noise images NP1 and the second linear noise images NP2, which have been extracted by processes optimal with respect to the properties of linear noise. Therefore, the generation of artifacts in the corrected radiation images can be reduced.

Still further, as illustrated in FIG. 18, the noise image extracting means 330 comprises: the frequency processing means 331, for extracting the high frequency components HP and the low frequency components LP in the direction of arrow Y from the reduced images P1 (P2); the first noise image generating means 32, for generating the first noise images NP1 by extracting low frequency components that extend in the direction of arrow Y from the high frequency components HP extracted by the frequency processing means 331; the line dividing means 131, for dividing the pixel lines L that extend along the linear noise components (the direction of arrow Y) within the low frequency components LP extracted by the frequency processing means 331 into a plurality of divided pixel line segments BL1 through BL3; the median calculating means 132, for calculating median values M1 through M3 of each of the divided pixel line segments BL1 through BL3; the second noise image generating means 133, for generating second linear noise images NP11 that represent the linear noise components LN, employing the median values M1 through M3 of each of the divided pixel line segments BL1 through BL3 calculated by the median calculating means 132; and the noise image generating means 231 for generating the linear noise images NP from the first linear noise images NP1 and the second linear noise images NP11. In this case, the fact that there is a high probability that components within images that represent anatomical structures are low frequency components is utilized, to positively remove the linear noise components LN while reducing the generation of artifacts due to correction.

The noise image generating means 231 may compare the absolute values of the pixel values of the first linear noise images NP1 and the second linear noise images NP11, and employ the pixels having the smaller absolute values to generate the linear noise images NP. In this case, components which are highly likely to be linear noise components can be employed to correct the radiation images P0. Therefore, artifacts due to correction can be reduced.

Further, the noise image generating means 231 may select one of the first linear noise images NP1 and the second linear noise images NP11 so as to match the properties of the radiation images P0, then the radiation images P0 may be corrected using the selected linear noise image. In this case, if there are no short linear components that represent anatomical structures in a radiation image P0 such as that which is obtained by imaging geometric patterns, the second linear noise image NP11 may be selected as the linear noise image which is employed to correct the radiation image P0, and in the case that short linear components that represent anatomical structures are included in a radiation image P0, the first linear noise image NP1 may be selected as the linear noise image which is employed to correct the radiation image P0, and artifacts can be reduced.

The present invention is not limited to the embodiments described above. For example, cases have been described in which correction is administered onto radiation images P0 which have been obtained by actually imaging subjects. However, the correction to remove linear noise components LN may be administered onto images for correction (solid images, for example) which are used for offset correction, shading correction, and residual image correction. Note that images for correction do not include linear components, such as linear components of anatomical structures, other than linear noise components LN. Therefore, filter parameters and the like that ensure positive stripe removal may be employed.

Figure 19:
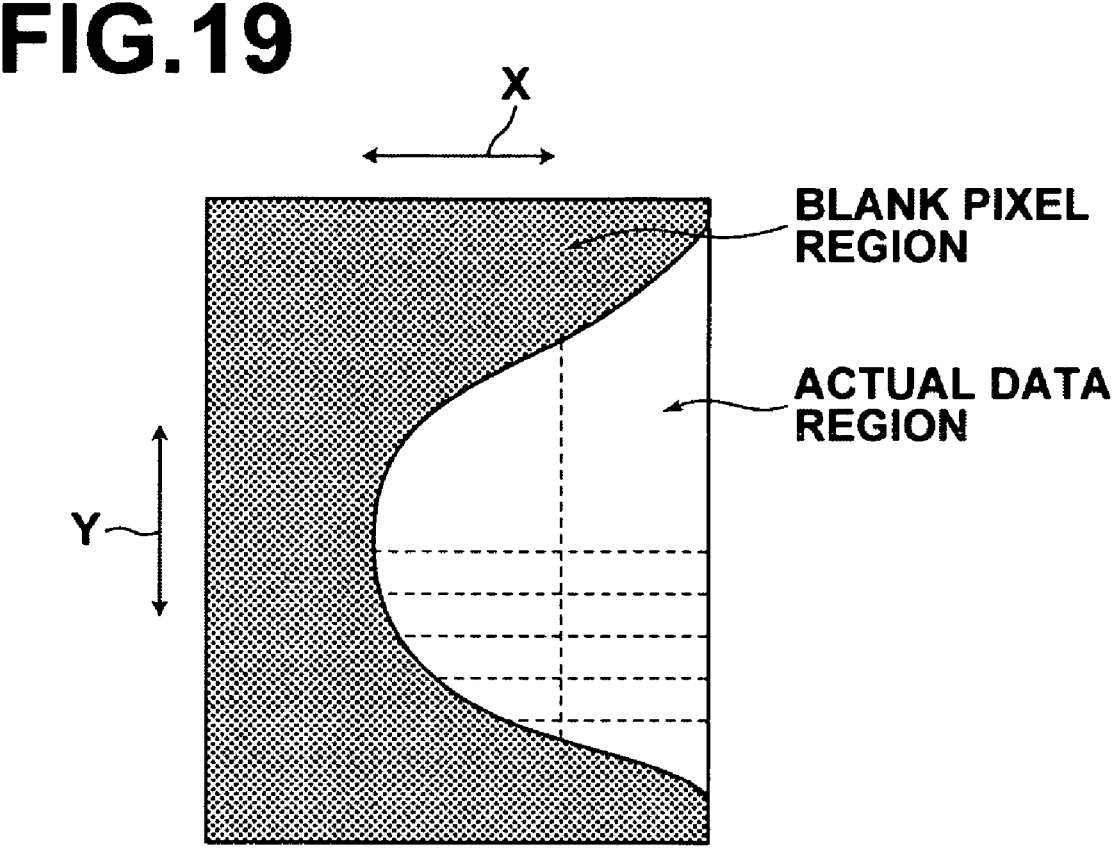
FIG. 19 is a diagram that illustrates an example of a radiation image which has been obtained by a mammography apparatus, and which is applied to the radiation image processing apparatus of the present invention.

In addition, each of the processes were administered across the entireties of the radiation images P0 in the embodiments described above. However, radiation images obtained by mammography apparatuses, for example, have blank pixel regions, as illustrated in FIG. 19. In these cases, the image obtaining means 10 may extract the blank pixel regions, and the aforementioned processes may be administered only on real data regions other than the blank pixel regions.

The foregoing description was given with respect to radiation images. However, it goes without saying that the present invention is applicable to all two dimensional images, including visible light images.

What is claimed is:

1. An image processing apparatus, comprising:
    image reducing means, for generating a reduced image by reducing an original image in at least one of a main direction and a sub direction;
    noise image extracting means, for generating a linear noise image by extracting linear noise components from the reduced image generated by the image reducing means;
    image enlarging means, for enlarging the linear noise image generated by the noise image extracting means to the image size of the original image; and
    image correcting means, for removing the linear noise components from the original image, employing the linear noise image which has been enlarged by the image enlarging means.

2. An image processing apparatus as defined in claim 1, wherein the noise image extracting means comprises:
    frequency processing means, for extracting high frequency components in a direction perpendicular to the direction of the linear noise components from the reduced image; and
    noise image generating means, for generating the linear noise image that represents the linear noise components by extracting low frequency components that extend in the direction of the linear noise components from the high frequency components extracted by the frequency processing means.

3. An image processing apparatus as defined in claim 1, wherein the noise image extracting means comprises:
    frequency processing means, for extracting high frequency components in a direction perpendicular to the direction of the linear noise components from the reduced image;
    line dividing means, for dividing pixel lines that extend along the linear noise components within the high frequency components extracted by the frequency processing means into a plurality of divided pixel line segments;
    median calculating means, for calculating median values of each of the divided pixel line segments; and
    noise image generating means, for generating the linear noise image that represents the linear noise components, employing the median values of each of the divided pixel line segments calculated by the median calculating means.

4. An image processing apparatus as defined in claim 1, wherein the noise image extracting means comprises:
frequency processing means, for extracting high frequency components in a direction perpendicular to the direction of the linear noise components from the reduced image;
first noise image generating means, for generating a first noise image that represents the linear noise components by extracting low frequency components that extend in the direction of the linear noise components from the high frequency components extracted by the frequency processing means;
line dividing means, for dividing pixel lines that extend along the linear noise components within the high frequency components extracted by the frequency processing means into a plurality of divided pixel line segments;
median calculating means, for calculating median values of each of the divided pixel line segments; and
second noise image generating means, for generating a second linear noise image that represents the linear noise components, employing the median values of each of the divided pixel line segments calculated by the median calculating means.

5. An image processing apparatus as defined in claim 1, wherein the noise image extracting means comprises:
frequency processing means, for extracting high frequency components and low frequency components in a direction perpendicular to the direction of the linear noise components from the reduced image;
first noise image generating means, for generating a first noise image that represents the linear noise components by extracting low frequency components that extend in the direction of the linear noise components from the high frequency components extracted by the frequency processing means;
line dividing means, for dividing pixel lines that extend along the linear noise components within the low frequency components extracted by the frequency processing means into a plurality of divided pixel line segments;
median calculating means, for calculating median values of each of the divided pixel line segments; and
second noise image generating means, for generating a second linear noise image that represents the linear noise components, employing the median values of each of the divided pixel line segments calculated by the median calculating means; and wherein:
the image correcting means removes the linear noise components from the original image, employing the first noise image and the second noise image, which have been enlarged by the image enlarging means.

6. An image processing apparatus as defined in claim 3, wherein:
the noise image generating means derives a function that represents the relationship between the positions of pixels in the pixel lines and the pixel values thereof, based on the plurality of median values calculated for each of the divided pixel line segments, and generates the linear noise image employing the derived function to calculate the pixel value of each pixel.

7. An image processing apparatus as defined in claim 4, wherein:
the image correcting means removes the linear noise component from the original image, by comparing the absolute values of the pixel values of the first linear noise image and the second linear noise image, and employing the pixels having the smaller absolute values.

8. An image processing apparatus as defined in claim 4, wherein:
the image correcting means selects one of the first linear noise image and the second linear noise image so as to match the properties of the original image, then removes the linear noise components from the original image.

9. An image processing apparatus as defined in claim 4, wherein:
the image correcting means generates an image, which is the original image from which the linear noise components have been removed employing the first linear noise image, and an image, which is the original image from which the linear noise components have been removed employing the second linear noise image.

10. An image processing apparatus as defined in claim 1, further comprising:
preliminary processing means, for administering a preliminary process onto the reduced image such that drastic changes in pixel values among pixels which are adjacent to each other in a direction perpendicular to the direction of the linear noise components are reduced; and
wherein:
the noise image extracting means extracts the linear noise image from the reduced image, on which the preliminary process has been administered.

11. An image processing apparatus as defined in claim 3, wherein:
the line dividing means divides the pixel lines into the divided pixel line segments while excluding blank pixel portions of the original image, to generate the linear noise image that represents the linear noise components.

12. An image processing method, comprising the steps of:
generating a reduced image by reducing an original image in at least one of a main direction and a sub direction;
generating a linear noise image by extracting linear noise components from the generated reduced image;
enlarging the generated linear noise image generated to the image size of the original image; and
image correcting means, for removing the linear noise components from the original image, employing the enlarged linear noise image.

13. A non-transitory computer readable medium having stored therein an image processing program that causes a computer to execute the procedures of:
generating a reduced image by reducing an original image in at least one of a main direction and a sub direction;
generating a linear noise image by extracting linear noise components from the generated reduced image;
enlarging the generated linear noise image generated to the image size of the original image; and
image correcting means, for removing the linear noise components from the original image, employing the enlarged linear noise image.

* * * * *